United States Patent
Niijima et al.

(10) Patent No.: US 6,587,311 B1
(45) Date of Patent: Jul. 1, 2003

(54) MAGNETIC STORAGE DEVICE HAVING A HEAD SUSPENSION

(75) Inventors: Masaaki Niijima, Kawasaki (JP); Masayoshi Amasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/651,168

(22) Filed: Aug. 30, 2000

(30) Foreign Application Priority Data

Dec. 13, 1999 (JP) ............................................. 11-353204

(51) Int. Cl.[7] ............................................. G11B 21/22
(52) U.S. Cl. ................. 360/255; 360/245.3; 360/245.7
(58) Field of Search ............................. 360/254.7, 255, 360/245.3, 245.7

(56) References Cited

U.S. PATENT DOCUMENTS 6,157,520 A * 12/2000 Mangold et al. ......... 360/245.3
6,233,121 B1 * 5/2001 Pan ......................... 360/245.7
6,381,101 B1 * 4/2002 Mohajerani et al. ..... 360/244.9

* cited by examiner

Primary Examiner—Robert S. Tupper
(74) Attorney, Agent, or Firm—Greer, Burns & Crain, LTD

(57) ABSTRACT

A magnetic storage device having a ramped-loading-type head suspension, in which a magnetic head slider mounted on a support beam can fly above a storage medium in stable state in the loading or unloading operation, is disclosed. The head suspension includes a support beam having a distal end and a proximal end, a gimbal pivotally coupled to the distal end portion of the support beam through a pivotal portion and a loading member connected to a free end of the gimbal positioned to the side nearer to the proximal end of the support beam. The provision of the loading member at the free end of the gimbal permits the flow-in end of a magnetic head slider mounted on the gimbal to be kept farther away from the surface of the storage medium than the flow-out end thereof, thereby eliminating an unstable flying state of the magnetic head slider.

10 Claims, 8 Drawing Sheets

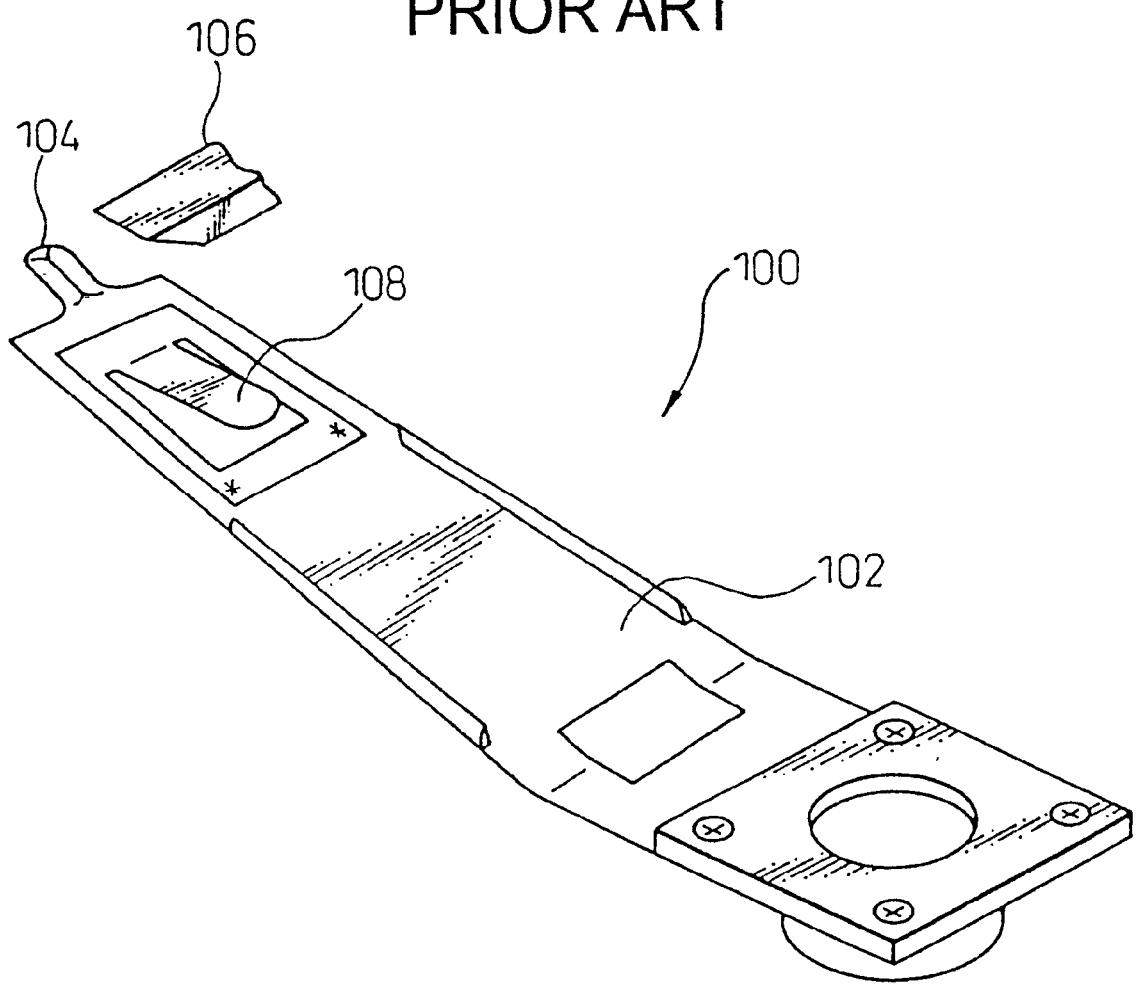

MAGNETIC STORAGE DEVICE HAVING A HEAD SUSPENSION

BACKGROUND OF THE INVENTION

1. Field of the Invention

The present invention relates to a magnetic storage device having a ramped-loading-type head suspension.

2. Description of the Related Art

A head suspension, which is generally used with a disk unit, such as a floppy disk unit or a hard disk unit, includes a support beam, a spacer and a gimbal. The gimbal is formed with higher flexibility than that of the support beam and is mounted on the portion near to one end (the free end) of the support beam. Specifically, the gimbal has a base portion with a tongue portion pivotally coupled thereto through a pivotal portion arranged on the side nearer to the distal end of the support beam. Also, the gimbal is coupled to the support beam at the end of the base portion of the gimbal arranged nearer to the proximal end opposite to the free end of the support beam. A magnetic head slider is further mounted on the surface of the tongue portion of the gimbal. Also, the spacer is formed with a boss and is coupled to the portion near to the other end of the support beam, and the head suspension is connected to a carriage arm through the boss. The driving force of an actuator is transmitted to the carriage arm by a transmission mechanism such as a lead screw, a steel belt or a spiral cam. Thus, the head suspension supporting the head slider thereon is driven via the carriage arm so that a magnetic head of the head slider can write and/or read data on a storage medium such as a magnetic disk having a magnetic film on the surface thereof.

The portions of the magnetic head slider and the storage medium near to each other will be now described in detail.

The support beam includes a rigid portion and a spring portion having a bent portion having an elasticity (spring nature). The spring portion is located near to the proximal end of the support beam supported by the carriage arm. The rigid portion, on the other hand, is located nearer to the distal end than the spring portion, and is generally formed with a rib on each side edge thereof to improve the rigidity. Also, a pivot is formed in the portion of the distal end of the support beam where the gimbal is mounted, and the tongue portion of the gimbal can rock on the pivot.

An urging force generated in the spring portion of the support beam is exerted on the head slider through the gimbal so that head slider is urged toward the storage medium while being able to rock on the pivot. This allows the head slider to follow the movement of the storage medium.

The head slider flies above the surface of the storage medium at a predetermined distance (typically about 20 nm) as the flying force floatation force, generated on the airbearing surface of the head slider by the air flowing between the surface of the rotating storage medium and the airbearing surface of the head slider, is balanced-by the urging force exerted on the head slider by the head suspension.

When the storage medium stops rotating, therefore, the head slider will not receive the flying force and will contact the surface of the storage medium. In such a magnetic storage device, it is necessary to protect a ring-shaped data zone of the storage medium, for data to be recorded, from the head slider when the storage medium is not rotating. A loading/unloading mechanism for carrying out such a protection is divided into two major types; a CSS (contact start stop) type and a ramped loading type.

In the CSS-type loading/unloading mechanism, the head slider is moved to the CSS zone located inside the data zone of the storage medium when the storage medium stops rotating. When the storage medium starts rotating and the head slider flies, on the other hand, the head slider moves to the data zone again. In the ramped-loading-type loading/unloading mechanism, in contrast, the head slider is moved onto a ramp located outside of the outer periphery of the storage medium and having the distal end portion thereof extending inward beyond the outer periphery of the storage medium. When the storage medium starts rotating, the head slider moves again to the data zone.

The CSS-type loading/unloading mechanism described above has been generally used in the prior art. Recently, however, an increased storage capacity has been required for the storage device, and in order to satisfy this requirement, the need has arisen to realize a higher data density by reducing the gap (the distance) between the head slider and the surface of the storage medium. To reduce the gap between the head slider and the surface of the storage medium, on the other hand, an improved smoothness of the surface is required for the storage medium. With improved smoothness of the surface of the storage medium, however, the problem is posed that the slider head is liable to be attached to the surface of the storage medium more easily, so that the load of the motor for resuming the rotation of the storage medium increases. This load, resulting from attachment of the head slider to the surface of the storage medium, is a problem especially in the case where a plurality of storage media are rotated with a single motor of the storage device to achieve an increased storage capacity of the storage device.

In contrast, the ramped-loading-type loading/unloading mechanism, in which the head slider and the surface of the storage medium are kept out of contact with each other when the storage medium is not in rotation, has the advantage that an additional load for starting the operation of the motor is not imposed on the motor for rotating the storage medium. Also, in view of the fact that the head slider is arranged on the ramp during non-rotation of the storage medium, the ramped-loading-type loading/unloading mechanism has a superior shock resistance and is suitable for use with a mobile device such as a mobile personal computer.

For the reasons described above, the current trend is toward wider use of the-ramped-loading type mechanism.

As shown in FIG. 10, in a head suspension 100 used with a ramped-loading-type loading/unloading mechanism, a tab 104 defined as a loading member formed integrally by deforming the support beam 102 protrudes beyond the center of the distal end of the support beam 102. When the storage medium stops rotating, the head suspension 100 is moved radially toward the outer periphery of the storage medium, and the tab 104 rides over the ramped surface of a slide-shaped ramp 106 extending over the storage medium beyond its outer periphery toward the center thereof. Thus the whole of the head suspension 100 is made to move away from the surface of the storage medium, so that a magnetic head slider mounted on a gimbal 108 supported on the head suspension 100 moves away from the surface of the storage medium (i.e. the unloading operation is performed). When the storage medium starts rotating, on the other hand, the head suspension 100 is moved to the outer peripheral portion of the storage medium by sliding down from the ramp 106 on the ramped surface thereof and approaches the storage medium in flying state (i.e. the loading operation is performed).

Further, as described above, the tongue portion of the gimbal with the head slider mounted thereon is pivotally coupled to the base portion of the gimbal through the pivotal portion arranged to the side nearer to the distal end of the support beam.

In the first step of the unloading operation, therefore, the tab contacts the ramped surface of the ramp, and the distal end of the head suspension moves away from the surface of the storage medium. Then, the flow-out end of the head slider, from which the air that has flowed into the gap between the head slider and the surface of the storage medium flows out, moves away from the surface of the storage medium. Finally, the flow-in end of the head slider positioned on the side opposite to the flow-out end thereof moves away from the surface of the storage medium. In the loading operation, by contrast, the flow-in end of the head slider contacts (approaches in flying state, to be more exact) the surface of the storage medium, and finally the flow-out end contacts (approaches in flying state, to be more exact) the surface of the storage medium.

Generally, the head suspension is arranged so that the storage medium moves from the proximal end of the head suspension toward the distal end thereof. Specifically, in the loading or unloading operation, the storage medium moves in such a direction as to be able to rub against the grain of the tongue portion of the gimbal. Should the smooth relative movement of the head slider to the storage medium be obstructed by the presence of foreign matter on the surface of the storage medium, therefore, the flow-in end of the head slider contacts the storage medium and an external force is exerted on the tongue portion of the gimbal to move it away from the support beam, sometimes resulting in damage to the head slider and to the storage medium. Also, the flow-in end of the head slider is lowered (comes closer to the storage medium) against the flow of the air into the gap between the head slider and the surface of the storage medium, and therefore the flying force becomes unstable, leading to the problem that the head slider and the storage medium are liable to contact each other.

SUMMARY OF THE INVENTION

Accordingly, the object of the present invention is to provide a magnetic storage device having a ramped-loading-type head suspension, in which in a loading or unloading operation of a magnetic head slider supported on the head suspension, the first step is to force a flow-in end of the head slider away from the surface of a storage medium thereby to stabilize the flying state of the head slider and thus reduce the possibility of damage to the head slider and to the storage medium due to contact in the loading or unloading operation.

In order to achieve the aforementioned object, according to one aspect of this invention, there is provided a head suspension, which includes a support beam having a distal end and a proximal end; a gimbal having a pivotal portion arranged to the side nearer to the distal end of the support beam and a free end arranged to the side nearer to the proximal end of the support beam, the gimbal being pivotally coupled to the distal end portion 20. of the support beam through the pivotal portion; and a loading member connected to the free end of the gimbal.

According to another aspect of the invention, there is provided a magnetic storage device, which includes the above-mentioned head suspension; a storage medium for storage of information; a magnetic head slider mounted on the gimbal of the head suspension in opposed relation to the storage medium; a driving unit for supporting the proximal end of the support beam of the head suspension and swing-ing the head suspension about the rotation axis; and a ramp having a ramped surface on which the loading member slides in a radial direction of the storage medium.

Preferably, in the head suspension, when the loading member of the head suspension is moved toward the support beam, the support beam and the gimbal of the head suspension are moved together after the gimbal moves toward the support beam about the pivotal portion.

Preferably, the gimbal has a portion extending the surface of the support beam.

Preferably, the loading member has a portion extending in the direction parallel to the surface of the gimbal.

The head suspension according to the present invention includes a loading member at the free end of the gimbal arranged to the side nearer to the proximal end of the support beam, so that when the loading member moves toward the support beam, the free end of the. gimbal moves toward the support beam about the pivotal portion arranged to the side nearer to the distal end of the support beam before the movement of the whole support beam. In the unloading operation, therefore, the flow-in end of the head slider bonded to the gimbal can move away from the surface of the storage medium first of all.

A further movement of the loading member toward the support beam causes the support beam and therefore the whole head suspension to move away from the surface of the storage medium. This movement results from the fact that the external force for moving the loading member toward the support beam is balanced with the reaction force generated by the spring effect due to the displacement of the gimbal and thereby transmitted to the support beam through the gimbal or the fact that the wing member of the gimbal contacts the support beam. Thus, the unloading operation can be performed while maintaining the flow-in end of the head slider farther away from the surface of the storage medium than the flow-out end thereof.

The loading operation is also similarly performed while maintaining the flow-in end of the head slider farther away from the surface of the storage medium than the flow-out end thereof. Thus, the flow-in end contacts the storage medium after the flow-out end of the head slider contacts the surface of the storage medium (or more exactly, flies in the air with a very small gap between the surfaces of the head slider and the storage medium).

BRIEF DESCRIPTION OF THE DRAWINGS

The above and other objects, features, and advantages of the present invention will be made more apparent from the following description of the preferred embodiments thereof with reference to the accompanying drawings, wherein:

FIG. 10 is a perspective view showing a ramped loading type of conventional head suspension.

DESCRIPTION OF THE PREFERRED EMBODIMENTS

Embodiments of the present invention will be described below with reference to the drawings.

Figure 1:
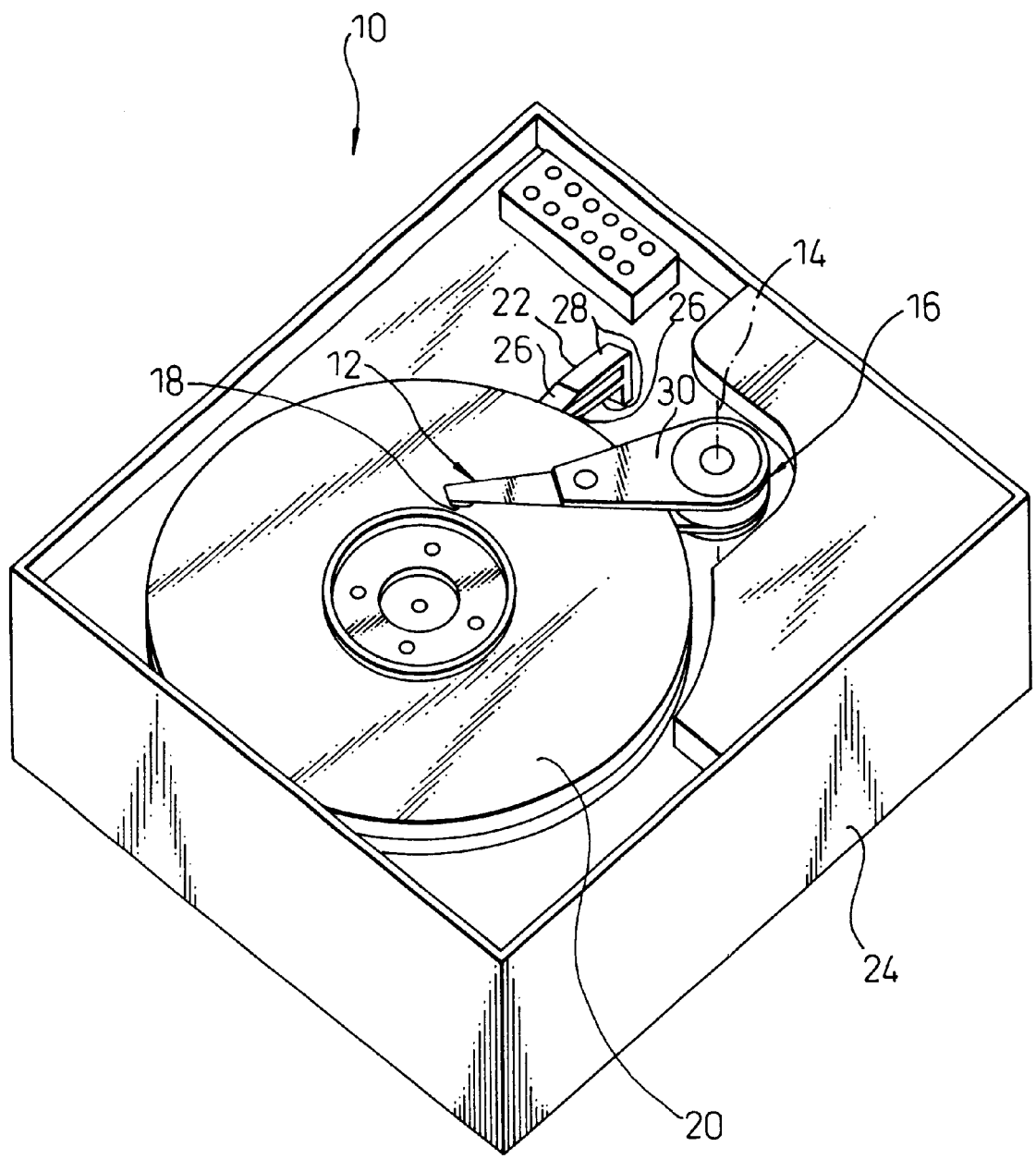
FIG. 1 is a perspective view illustrating a general construction of a magnetic storage device having a pair of head suspensions according to the present invention arranged to both sides of a storage medium.
Figure 2:
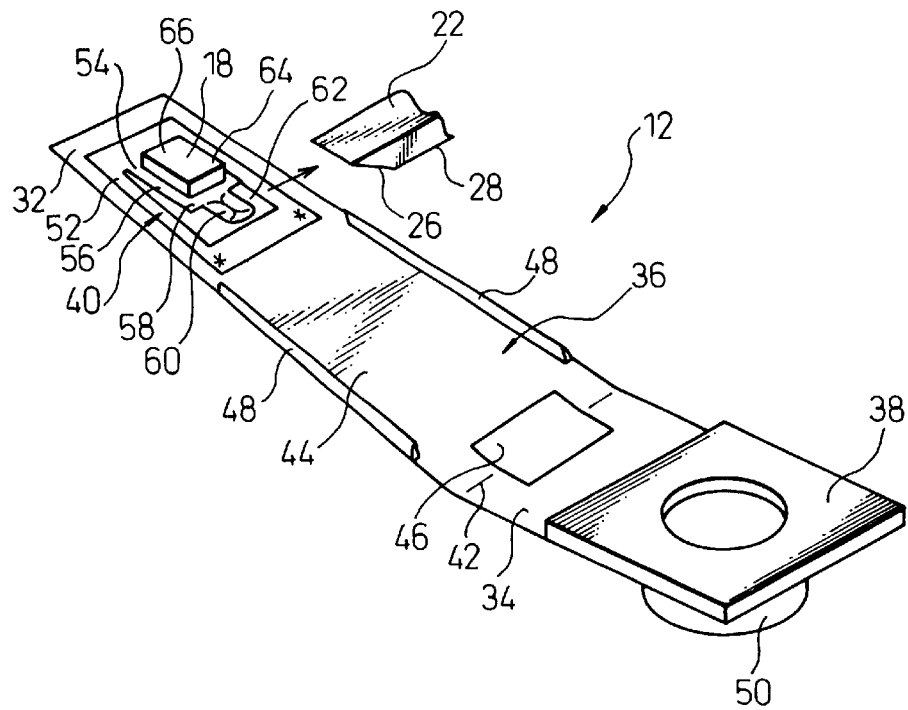
FIG. 2 is a perspective view showing the head suspension located under the storage medium in FIG. 1 according to a first embodiment.

FIG. 1 is a perspective view illustrating a gereral construction of a magnetic storage device having a pair of head suspensions according to the present invention arranged on both sides of a storage meduim. FIG. 2 is a perspective view of the head suspension of FIG. 1 according to one embodiment thereof, in which the head suspension located under the storage medium is shown.

Referring to FIG. 1, the magnetic storage device 10 according to the present invention includes head suspensions 12, a driving unit 16 for supporting the proximal end of the head suspensions 12 and swinging it about a rotation axis 14, magnetic head sliders 18 mounted on the portions near to the distal ends (free ends) of the respective head suspensions 12, a storage medium 20 rotated by an actuator (not shown) such as a spindle motor, a ramp 22 located outside the outer periphery of the storage medium 20, and a housing 24 for accommodating these components.

The head slider 18 is arranged in opposed relation to the storage medium 20 and is provided with a magnetic head which can record information on the storage medium magnetically. Also, the ramp 22 includes a ramped portion having a ramped surface 26 and a level portion having a level surface 28. A part of the ramped portion of the ramp 22 at least projects inwardly over the outer periphery of the storage medium 20 in proximity to the surface of the storage medium 20 but is not in contact with it.

In particular, the driving unit 16 includes a carriage arm 30 for supporting the proximal end of the head suspension 12, and an actuator (not shown) for swinging the head suspension 12 about the rotation axis 14 via the carriage arm 30.

In the magnetic storage device 10 shown in FIG. 1, a pair of the head suspensions 12, each of which is provided with the magnetic head slider 18 on the portion near to the distal end (free end) of the hand suspension 12, are arranged on both sides of one disk-like storage medium 20. These head suspensions 12 are connected respectively through carriage arms 30 to a single actuator, which drives them in common. It should be understood that the magnetic storage device 10 according to the present invention may include a plurality of storage media 20 in order to increase the storage capacity and in this case a pair of head suspensions 12 having magnetic head sliders 18 are arranged on both sides of each storage medium 20. It should also be understood that in the case of using only one side of the storage medium 20 for data storage, only one head suspension supporting the magnetic head slider 18 on the portion near to the distal end thereof 12 must be arranged.

The head suspension 12 will be now described in detail with reference to FIG. 2.

The head suspension 12 shown in FIG. 2 includes a support beam 36 having a distal end (free end) 32 and a proximal end 34, a spacer 38 coupled to the proximal end 34 of the support beam 36, and a gimbal 40 mounted on the portion near to the distal end 32 of the support beam 36. paragraph beginning on page 10, line 30 has been amended to read as The support beam 36 further includes a bent portion 42 functioning as a leaf spring and formed on the side nearer to the proximal end 34 of the support beam 36, and a rigid portion 44 located between the bent portion 42 and the distal end 32 of the support beam 36. The support beam 36 is bent such that the magnetic head slider 18 mounted on the portion near to the distal end 32 of the support beam 36 can be urged toward the storage medium 20. Preferably, as shown in FIG. 2, bent portion 42 is formed with a window 46 in order to improve the flexibility thereof while at the same time the rigid portion 44 is formed with ribs 48 at the side edges thereof.

The spacer 38 coupled to the proximal end 34 is formed with a boss 50 extending through the base end 34 of the support beam 36 in a direction of thickness. The spacer 38 is connected to the carriage arm 30 of the driving unit 16 through the boss 50.

The gimbal 40 shown in FIG. 2 is formed as a part separate from the support beam 36. This gimbal 40 includes a base portion 52 and a tongue portion 56 pivotally coupled to the base portion 52 through the pivotal portion 54. The tongue portion 56 is connected to a loading member 60 at the free end 58 thereof defined as the end positioned on the side opposite to the pivotal portion 54. The base portion 52 and the tongue portion 56 have about one half through one third thickness as small as that of the support beam 36.

The base portion 52 is formed in the shape of a frame having a central window 62. Only one end of the base portion 52 arranged to the side nearer to the proximal end 34 of the support beam 36 is bonded to the surface of the portion near to the distal end 32 of the support beam 36 by a well-known bonding technique such as laser spot welding or using an adhesive. On the other hand, the other end of the base portion 52 is not bonded to the surface of the support beam 36. When the gimbal 40 is mounted on the support beam 36, the pivotal portion 54 of the tongue portion 56 is arranged nearer to the distal end 32 of the support beam 36.

The head slider 18 is bonded to the outer surface of the tongue portion 56 (i.e., the surface in opposed relation to the storage medium) by a suitable bonding technique. Also, the surface of the support beam 36 is formed with a pivot (not shown) in the window 62 of the base portion 52 positioned under the tongue portion 56. Thus, the tongue portion 56 can rock on the pivot, so that the head slider 18 mounted on the tongue portion 56 can follow the movement of the surface of the storage medium 20 and thereby maintain planar contact with the surface. Specifically, the gimbal 40 shown in FIG. 2 is configured in a manner similar to the gimbal used with the conventional head suspension, except that the loading member 60 is connected to the free end 58 of the tongue portion 56.

Referring to FIG. 2, the loading member 60 connected to the tongue portion 56 has an angle-shaped section and is in contact, at the apex thereof, with the ramped surface 26 of the ramp 22 arranged outside of the outer periphery of the storage medium 20. The loading member 60 may be formed either integrally with the tongue portion 56 or coupled, as a separate part, to the tongue portion 56. Further, as an alternative embodiment, a rod member having a circular section and defined as a separate part can be used as the loading member 60 connected to the tongue portion 56.

When the loading member 60 moves along the ramped surface 26 of the ramp 22 in the unloading operation for moving the head slider 18 away from the storage medium 20, the free end 58 of the tongue portion 56 of the gimbal 40 is moved toward the support beam 36 about the pivotal portion 54, so that the flow-in end 64 of the head slider 18 (the end of the head slider 18 positioned nearer to the proximal end 34 of the support beam 36) is moved away from the storage medium 20 first of all. Then, the free end 58 of the tongue portion 56 is moved further toward the support beam 36 so that the loading member 60 contacts the surface of the support beam 36. While the flow-in end 64 of the head slider 18 is kept farther away from the storage medium 20 than the flow-out end 66 on the opposite side thereof, the whole of the support beam 36 or the head suspension 12 is moved away from the storage medium 20. In the loading operation for making the head slider 18 approach the storage medium 20, on the other hand, the movement of the loading member 60 along the ramped surface 26 of the ramp 22 similarly results in the whole head suspension 12 approaching the storage medium 20 while keeping the flow-in end 64 of the head slider 18 farther away from the storage medium 20 than the flow-out end 66.

As described above, in the loading or unloading operation, the flow-in end 64 of the head slider 18 is kept farther away from the storage medium 20 than the flow-out end 66. Therefore, the flying force exerted on the head slider 18 by the air flowing between the surfaces of the head slider 18 and the storage medium 20 is kept in a stable state. Also, foreign matter, which may be present on the surface of the storage medium 20, is prevented from contacting the flow-in end 64 of the head slider 18 and thereby moving the tongue portion 56 away from the surface of the support beam 36.

Figure 3:
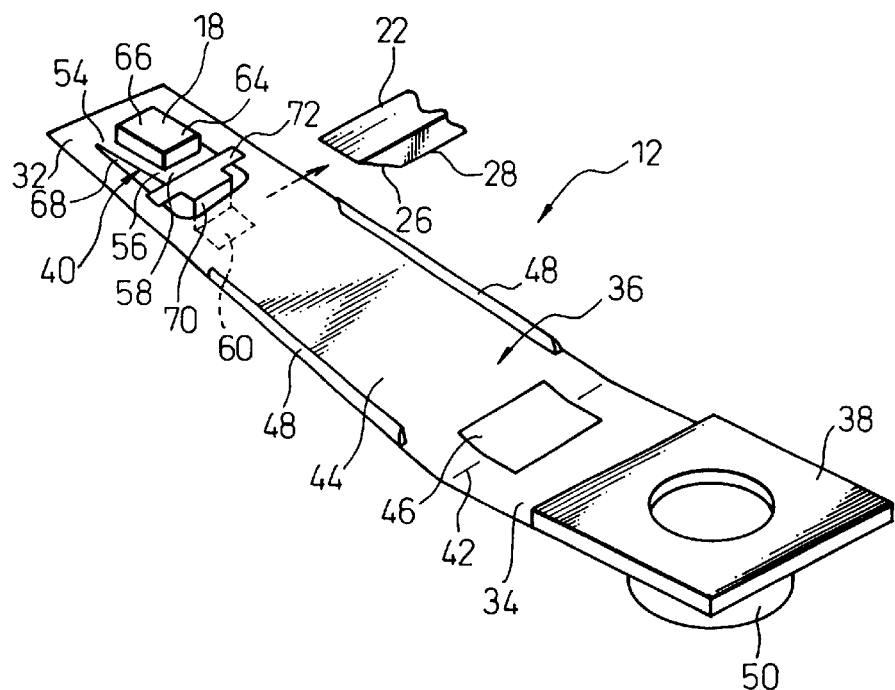
FIG. 3 is a perspective view showing the head suspension according to a second embodiment of the present invention.
Figure 4:
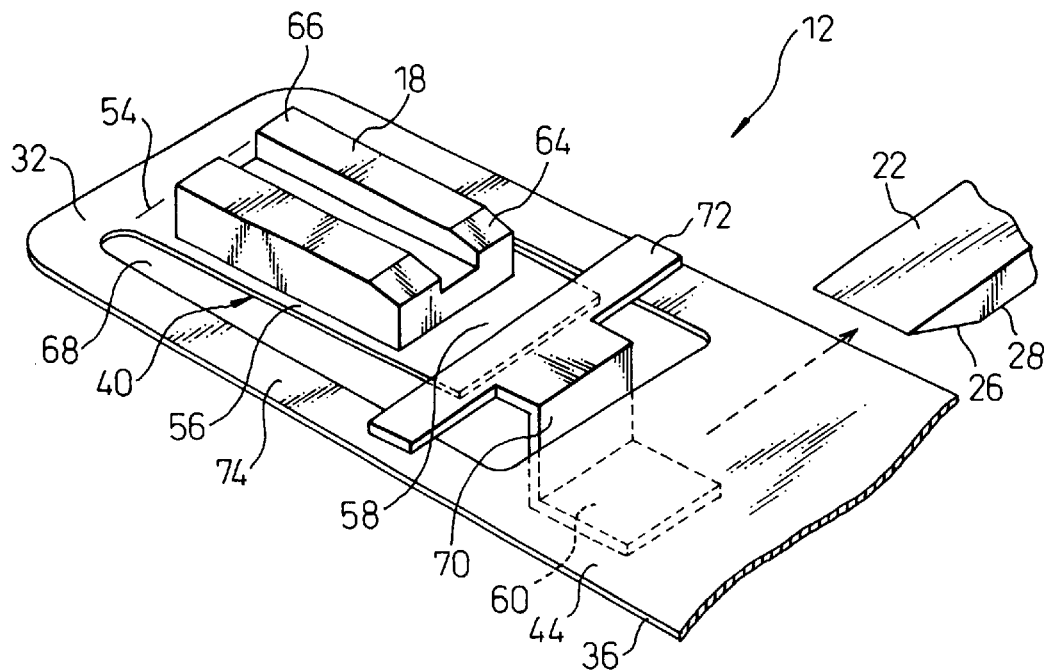
FIG. 4 is an enlarged view showing in detail the portion adjacent to the distal end of the head suspension of FIG. 3.

FIG. 3 is a perspective view showing the head suspension 12 of FIG. 1 according to a second embodiment. FIG. 4 is an enlarged view showing the head suspension 12 of FIG. 3 in detail. The head suspension 12 shown in FIGS. 3 and 4 is different from the embodiment of FIG. 2 in the gimbal 40.

The head suspension 12 shown in FIG. 3, similarly to that shown in FIG. 2, includes a support beam 36 having a distal end 32 and a proximal end 34, a spacer 38 coupled to the proximal end 34 and formed with a boss 50, and a gimbal 40 mounted on the portion near to the distal end 32 of the support beam 36. The support beam 36 and the spacer 38 are similar to those shown in FIG. 2 and will not be specifically described here.

Referring to FIG. 4, the gimbal 40 is formed integrally with the support beam 36. The tongue portion 56 of the gimbal 40, defined as the portion for the head slider to be mounted on, is pivotally coupled directly to the support beam 36 through the pivotal portion 54. Further, the loading member 60 is connected to the free end 58 of the tongue portion 56 defined as the end positioned on the side opposite to the pivotal portion 54. Also, as in FIG. 2, the pivotal portion 54 is arranged nearer to the distal end 32 of the support beam 36. Further, the tongue portion 56 of the gimbal 40 is constructed to urge the head slider 18, which is coupled to the surface of the tongue portion 56 by the suitable bonding technique, toward the surface of the storage medium 20 arranged in opposed relation to the head slider 18 with a very small force.

The gimbal 40 shown in FIG. 4 can be made by forming a slit 68 defining the peripheral edge profile of the tongue portion 56 by using such a technique as etching or punching while leaving the pivotal portion 54 at the distal end 32 of the support beam 36 and thereby moving the tongue portion 56 away from the support beam 36. Also, in order to enhance the function of the gimbal 40, the pivotal portion 54 and the tongue portion 56 may be reduced in thickness using such a technique as half etching or grinding. The gimbal 40 formed in this way has the feature that the tongue portion 56 thereof can be displaced toward both the front and back sides of the support beam 36.

Also, the loading member 60 shown in FIG. 4 extends in a plane different from a plane in which the tongue portion 56 of the gimbal 40 extends, and is connected to the free end 58 of the gimbal 40 via a connecting member 70 connecting the tongue portion 56 of the gimbal 40 and the loading member 60. Preferably, the loading member 60 is arranged such that the support beam 36 is positioned between the loading member 60 and the head slider 18, and is connected to the free end 58 of the gimbal 40 via the connecting member 70 extending at a predetermined angle to the surface of the tongue portion 56. In this case, the loading member 60 preferably extends in a direction parallel to the surface of the tongue portion 56 of the gimbal 40.

Preferably, the loading member 60 and the connecting member 70 have a larger thickness and a higher rigidity than the gimbal 40. The loading member 60, which is shown as a plate-shaped member in FIG. 4, may be formed in the shape of a member having an angle section or a round rod as shown in the embodiment of FIG. 2.

In the aforementioned configuration, the force applied from the ramped surface 26 of the ramp 22 to the loading member 60 by their contacting is transmitted to the free end 58 of the gimbal 40. In the unloading operation, therefore, the free end 58 of the gimbal 40 is moved in the direction away from the surface of the storage medium 20 first of all so that the flow-in end 64. of the head slider 18 is moved away from the surface of the storage medium 20, after which the free end 58 of the gimbal 40 passes through the support beam 36 to the other side of the support beam 36. Then, the force applied to the gimbal 40 through the loading member 60 by the surface of the ramp 22 is balanced with the reaction force of the gimbal 40 due to its displacement, so that the whole of the support beam 36 or the head suspension 12 is moved away from the storage medium 20. During the process, the flow-in end 64 of the head slider 18 is kept farther from the storage medium 20 than the flow-out end 66. In other words, the head suspension 12 shown in FIG. 4 can perform the same operation as the head suspension 12 described with reference to the embodiment shown in FIG. 2. The loading operation of the head suspension 12 can of course be performed in a manner similar to that of FIG. 2. As a result, the head suspension 12 shown in FIG. 4 can exhibit the same effect as the embodiment shown in FIG. 2.

Referring to FIG. 4, the gimbal 40 further includes, at the free end 58 thereof, a wing member 72 which is protruded sideways from the peripheral edge of the tongue portion 56 of the gimbal 40 to the two side edge portions of the support beam 36 so that it has a portion extending over the surface of the support beam 36. Preferably, the wing member 72 has a larger thickness and higher rigidity than the gimbal 40 similarly to the loading member 60 and the connecting member 70. Further, the loading member 60, the connecting member 70 and the wing member 72 are preferably formed integrally with each other.

In the case where the wing member 72 is provided, the connecting member 70 is required to have such a length that the distance between the support beam 36 and the loading member 60 is more than the thickness of the ramp 22 when the wing member 72 is in contact with the support beam 36.

The effect exhibited by the wing member 72 will be described below.

In the unloading operation, for example, when the loading member 60 contacts the ramped surface 26 of the ramp 22, the free end 58 of the gimbal 40 is moved toward the support beam 36 about the pivotal portion 54 first of all thereby to move the flow-in end 64 of the head slider 18 away from the surface of the storage medium 20. A further movement of the free end 58 toward the support beam 36 results in the wing member 72 contacting the support beam 36, thereby moving the support beam 36 or the whole of the head suspension 12 in the direction away from .the surface of the storage medium 20. The support beam 36, which has a higher rigidity than the gimbal 40, suppresses the generation of twisting of the gimbal 40 about the longitudinal axis thereof. Thus, the flying state of the head slider 18 is stabilized to a greater degree in the loading or unloading operation.

Figure 5:
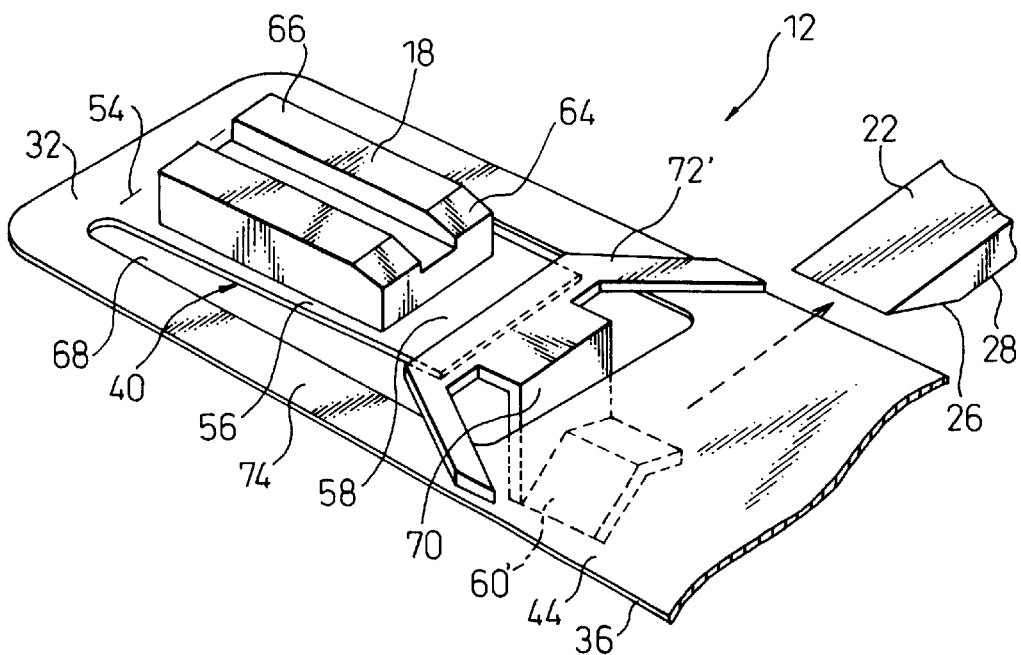
FIG. 5 is an enlarged view showing in detail the portion adjacent to the distal end of the head suspension according to a third embodiment of the present invention.

Referring to FIG. 5, this head suspension 12 is similar to that shown in FIG. 4, but is different in that a loading member 60' is formed in an angle shape. This shape of the loading member 60' causes it to contact the ramp 22 not at a plane but at a point, and therefore the twist otherwise generated in the unloading or loading operation of the head suspension 12 can be suppressed.

Also, unlike the wing member 72 shown in FIG. 4 which extends linearly transversely of the support beam 36 (in the direction perpendicular to the longitudinal axis of the support beam in a horizontal plane) to the two side edges thereof from the free end 58 of the gimbal 40, the wing member 72' shown in FIG. 5 extends obliquely to the side of the proximal end 34 of the support beam 36 from the free end 58 of the gimbal 40.

When the free end 58 of the gimbal 40 moves toward the support beam 36 and the wing member 72 contacts the support beam 36, the wing member 72 shown in FIG. 4 contacts two girder portions (side edge portions) 74 extending along the sides of the gimbal 40 between the portion of the rigid portion 44 of the support beam 36 nearer to the proximal end and the distal end 32 to connect them. On the other hand, in the wing member 72' of FIG. 5, at least a part of the wing member 72' contacts the wide rigid portion 44 located nearer to the proximal end 34 of the support beam 36. In this way, as the result of the wing member 72' not contacting the girder portions 74 of the support beam 36 but contacting the wide rigid portion 44 located nearer to the proximal end 34 thereof, the external force transmitted from the wing member 72' is exerted on a portion of higher rigidity thereby to suppress the twist which otherwise might be generated in the portion located near to the distal end 32 of the support beam 36.

Figure 6:
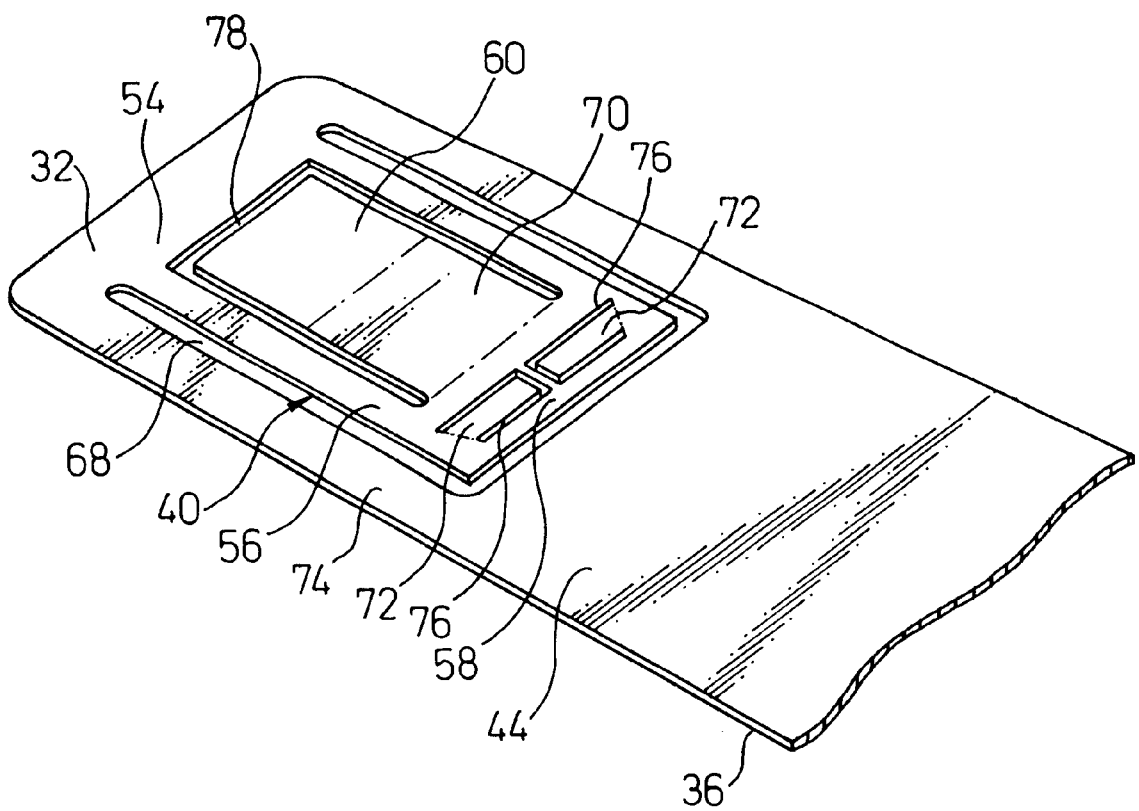
FIG. 6 is an enlarged view showing in detail the portion adjacent to the distal end of the head suspension before being assembled according to a fourth embodiment of the invention.
Figure 7:
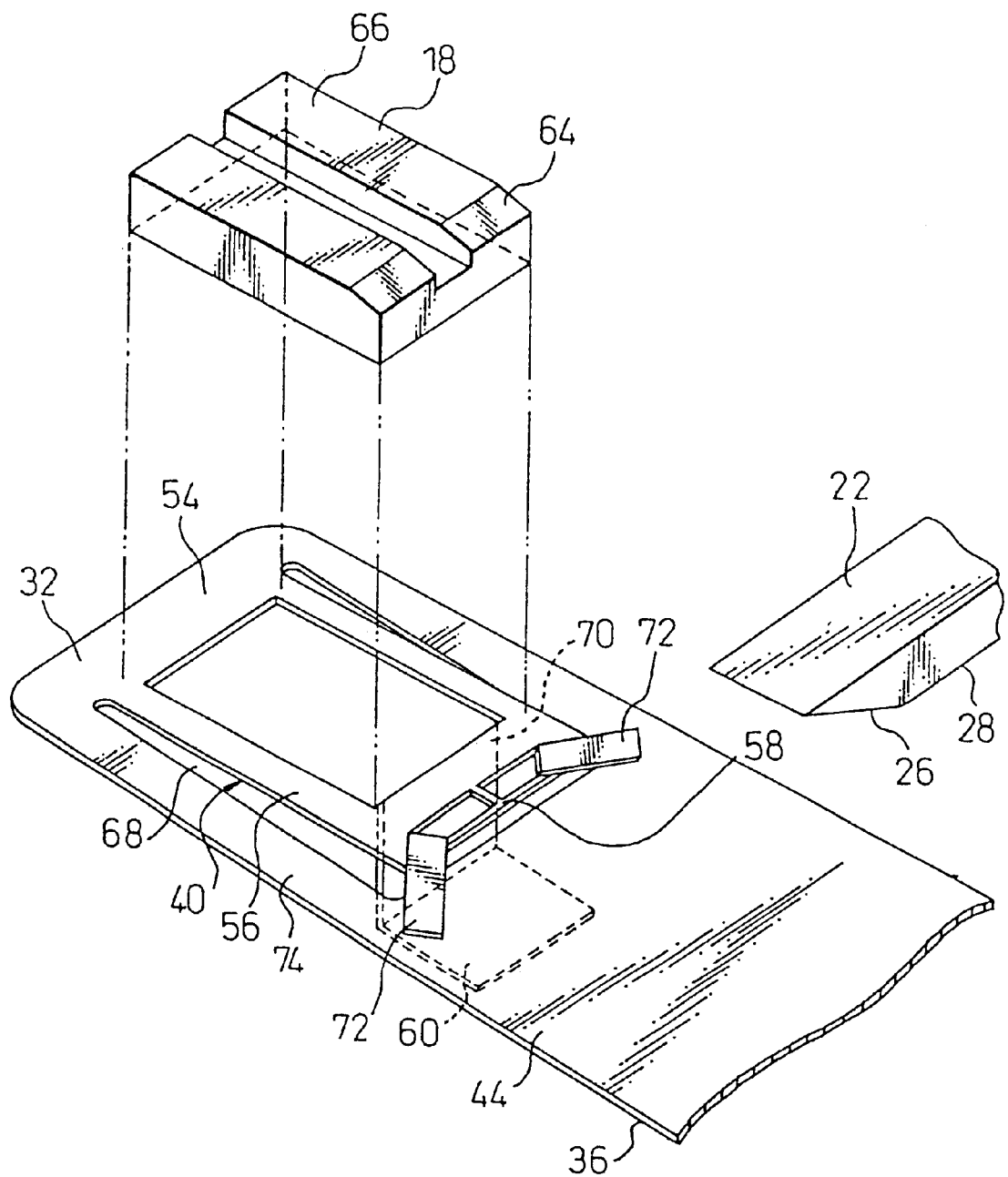
FIG. 7 is an enlarged view showing in detail the portion adjacent to the distal end of the head suspension of FIG. 6 after being assembled.

FIGS. 6 and 7 are perspective views showing a head suspension 12 according to a fourth embodiment of the invention, in which components of embodiments shown in FIGS. 4 and 5 such as a support beam 36, a gimbal 40, a loading member 60 and wing members 72, 72' are formed integrally with each other.

Referring to FIG. 6, as described with reference to the embodiment shown in FIG. 4, a slit 68 is formed in the shape defining the peripheral edge of the gimbal 40 and in the portion near to the distal end 32 of the support beam 36 by a suitable technique such as etching. Further, inside the portion to be formed as the gimbal 40, slits 76, 78 are formed in the shape defining the peripheral edge of the portions to be formed as the wing members 72, the connecting member 70 and the loading member 60.

The portion to be formed as the wing member 72 is located in the neighborhood of the free end 58 of the portion to be formed as the gimbal 40, and is formed with the slits 76 in the shape defining the peripheral edge of the wing member 72 except for each end to be supported as shown in FIG. 6. The portions to be formed as the loading member 60 and the connecting member 70, on the other hand, are located nearer to the pivotal portion 54 than the portions to be formed as the wing members 72 within the portion to be formed-as the gimbal 40, and are formed with a slit 78 in the shape defining the peripheral edge thereof except for the ends to be supported as in the case of the wing member 72.

The portions to be formed as the loading member 60 and the connecting member 70 shown in FIG. 6 are folded back as shown in FIG. 7 such that the distal end of the loading member 60 is directed toward the side of the proximal end 34 of the support beam 36. The portions to be formed as the wing members 72 are folded back such that the distal ends thereof extend over the peripheral edges of the gimbal 40. Further, the head suspension 12 having the same structural features as that of FIG. 4 is formed by bonding the head slider 18 to the surface of the gimbal 40.

Thus, the head suspension 12 can be reduced further in both weight and size by forming the loading member 60, the connecting member 70 and the wing members 72 integrally with each other. Therefore, the possibility of affecting the flying characteristic of the head slider 18 can be reduced which otherwise might result from the increased mass by adding another member to the gimbal 40.

On the other hand, the problem of an insufficient rigidity for the loading member 60, the connecting member 70 and the wing members 72 to perform the functions thereof may occur in view of the fact that these members are formed from the gimbal 40 which is thin. This problem can be obviated, however, by forming the gimbal 40 in such a manner that only the portions necessary for performing the function of the gimbal 40 are thinned by half etching while the portions to be formed as the members 60, 70, 72 are made as thick as the support beam 36.

Figure 8:
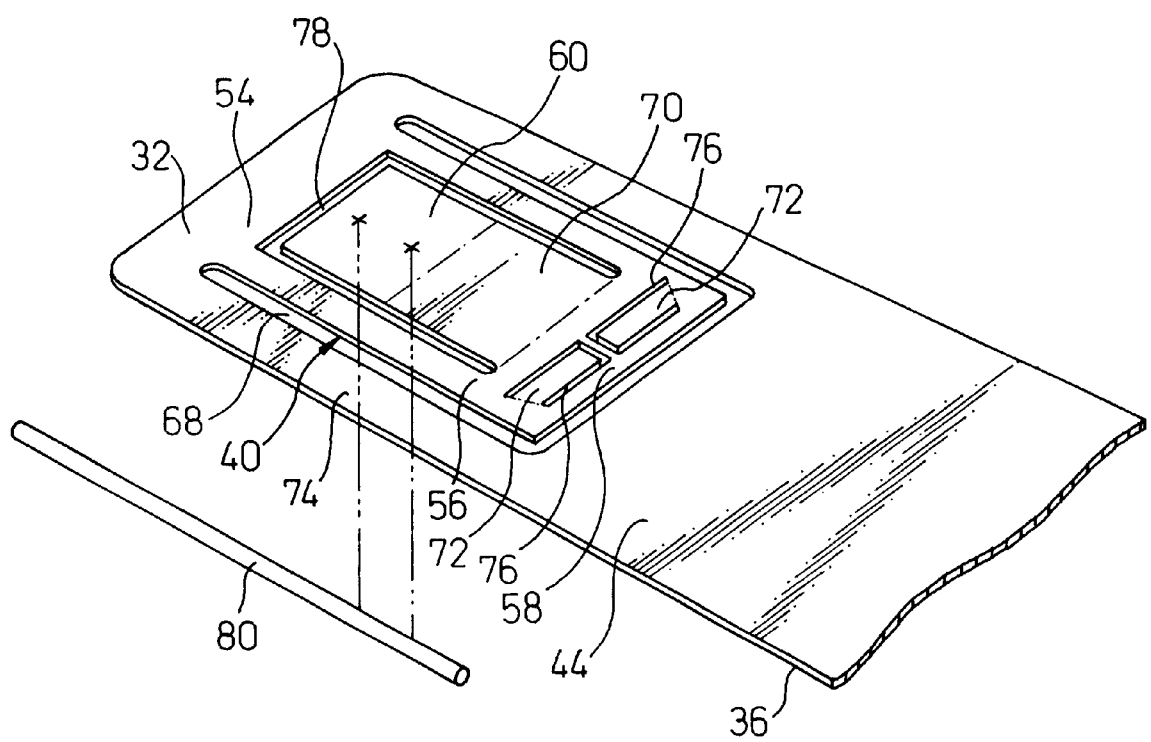
FIG. 8 is an enlarged view showing in detail the portion adjacent to the distal end of the head suspension before being assembled according to a fifth embodiment of the present invention.
Figure 9:
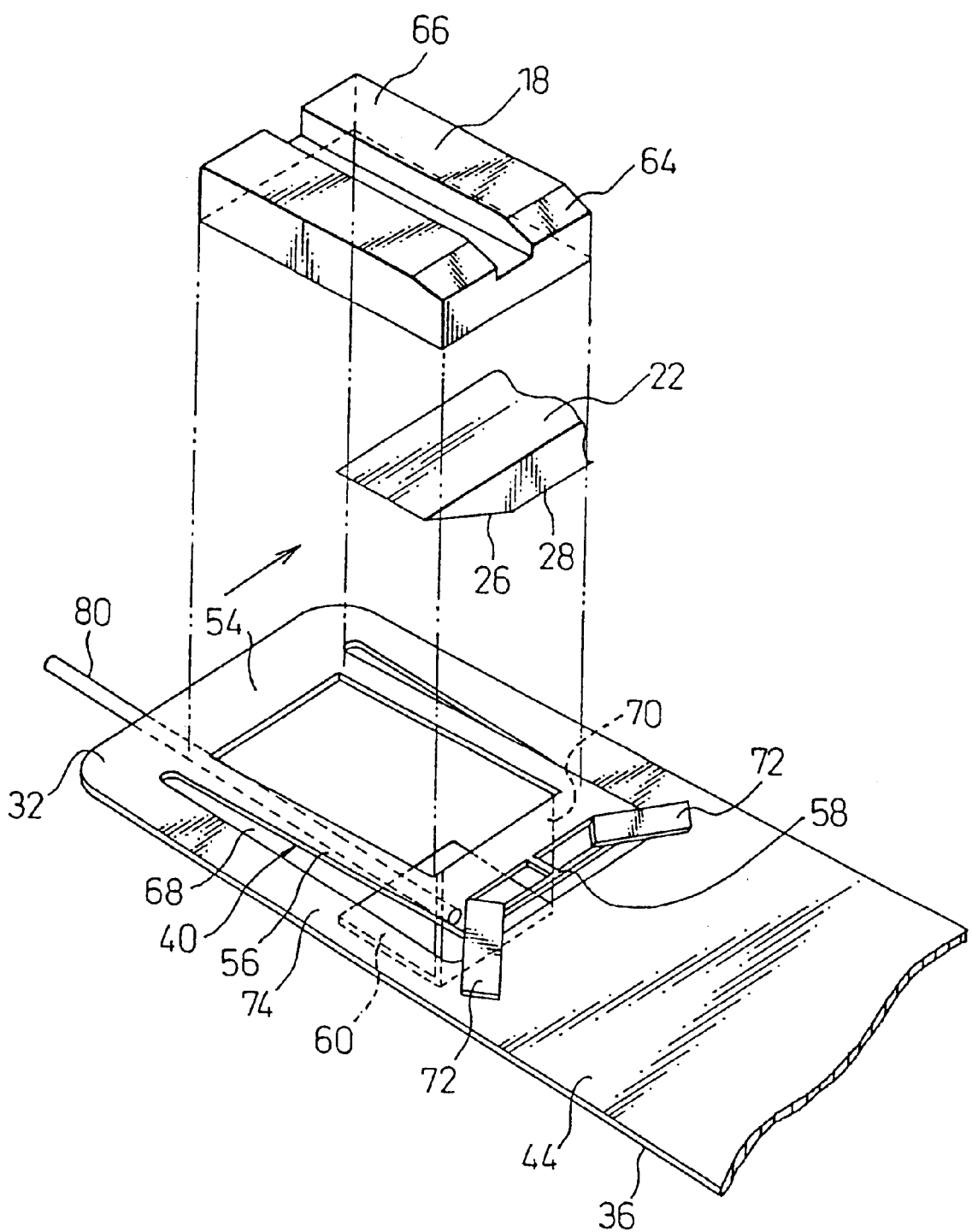
FIG. 9 is an enlarged view showing in detail the portion adjacent to the distal end of the head suspension of FIG. 8 after being assembled.

FIGS. 8 and 9 show a head suspension 12 according to a fifth embodiment of the present invention similar to that shown in FIGS. 6 and 7.

Referring to FIG. 8, the portions to be formed as the gimbal 40, the loading member 60, the connecting member 70 and the wing members 72 according to this embodiment are formed in a similar manner to FIG. 6. In this embodiment, however, the distal end of the portion to be formed as the loading member 60 is folded back to the side of the distal end 32 of the support beam 36 and, by bonding a rod member 80 to the portion to be formed as the loading member 60 as shown in FIG. 9, the functional portion of the loading member 60 is extended and protruded beyond the distal end 32 of the support beam 36. The rod member 80 preferably has a circular or angular section and is bonded to the portion to be formed as the loading member 60 by use of welding, an adhesive or another suitable bonding technique.

The head slider 18 is mounted on the surface of the gimbal 40 of the head suspension 12 configured as described above. This arrangement, as the conventional head suspension having the loading member 60 at the distal end 32 of the support beam 36, allows the ramp 22 to contact the portion near to the distal end of the head suspension 12 or the portion near to the distal end 32 of the support beam 36. Therefore, the ramp 22 is not in contact with the support beam 36.

On the other hand, the portion to be formed as the loading member 60 extended by bonding the rod member 80 thereto is connected to the free end 58 of the gimbal 40. Therefore, when the ramped surface 26 of the ramp 22 and the rod member 80 constituting the extension of the loading member 60 contact each other in the unloading operation, for example, the free end 58 of the gimbal 40 moves toward the support beam 36 first of all. As a result, the flow-in end 64 of the head slider 18 moves away from the surface of the storage medium 20 before all the other portions.

In each of the embodiments shown in FIGS. 3 to 9 where the gimbal 40 and the support beam 36 are formed integrally, the function of the gimbal 40 can be improved by mounting an independent member on the support beam 36 and thus by providing a pivot on the side of the gimbal 40 opposite to the head slider 18. Also, the wing members 72 are not.necessarily arranged at the free end 58 of the gimbal 40 but at any other arbitrary location of the gimbal 40.

Further, the head suspension according to the present invention can be used for supporting other types of the recording head including an optical head.

It will thus be understood from the foregoing description that, according to the present invention, there is provided a ramped-loading-type head suspension which includes a loading member at the free end of the gimbal, wherein the flow-in end of the magnetic head slider is kept farther than the flow-out end thereof from the surface of the storage medium in the operation of loading or unloading the magnetic head slider, and therefore the unstable flying state of the magnetic head slider is eliminated. Also, any foreign matter which may be present on the storage medium can be prevented from causing damage to the magnetic head slider and to the storage medium due to the load which otherwise might be imposed by the foreign matter causing the gimbal with the magnetic head slider mounted thereon to move away from the support beam. As a result, a reliable magnetic storage device is realized in which neither the magnetic head slider nor the storage medium is liable to be easily damaged.

What is claimed is:

1. A head suspension comprising:

a support beam having a distal end and a proximal end;

a gimbal having a mounting surface adapted to mount a magnetic head slider, a pivotal portion arranged on the side nearer to said distal end of said support beam and a free end arranged on the side nearer to said proximal end of said support beam, said gimbal being pivotally coupled to the distal end portion of said support beam through said pivotal portion, said gimbal having a portion that extends over a part of said support beam; and a loading member connected to said free end of said gimbal.

2. The head suspension according to claim 1, wherein said loading member has a portion extending in the direction parallel to said mounting surface of said gimbal.

3. The head suspension according to claim 1, wherein at least a part of said loading member extends in a plane different from a plane where said mounting surface extends.

4. The head suspension according to claim 3, wherein the plane where said at least part of said loading member is positioned on the side of said gimbal opposite to said mounting surface.

5. A magnetic storage device comprising:

a head suspension including a support beam having a distal end and a proximal end, a gimbal having a mounting surface, a pivotal portion arranged on the side nearer to said distal end of said support beam and a free end arranged on the side nearer to said proximal end of said support beam, said gimbal being pivotally coupled to the distal end portion of said support beam through said pivotal portion, said gimbal having a portion that extends over a part of said support beam, and a loading member connected to said free end of said gimbal;

a storage medium for storage of information therein;

a magnetic head slider mounted on said mounting surface of said gimbal of said head suspension in opposed relation to said storage medium;

a driving unit for supporting said proximal end of said support beam of said head suspension and for swinging said head suspension about a rotation axis; and a ramp having a ramped surface on which said loading member slides in a radial direction of said storage medium.

6. The magnetic storage device according to claim 5, wherein said gimbal has means for making contact with said support beam when said loading member of said head suspension is moved toward said support beam, so that said support beam and said gimbal of said head suspension are moved together after said gimbal moves toward said support beam about said pivotal portion.

7. The magnetic storage device according to claim 5, wherein said loading member has a portion extending in the direction parallel to said mounting surface of said gimbal.

8. The magnetic storage device according to claim 5, wherein at least a part of said loading member extends in a plane different from a plane where said mounting surface extends.

9. The magnetic storage device according to claim 8, wherein the plane where said at least part of said loading member is positioned on the side of said gimbal opposite to said mounting surface.

10. The magnetic storage device according to claim 8, wherein said loading member is arranged such that said support beam is positioned between at least a part of said loading member and said head slider.

* * * * *